(12) United States Patent
McKee et al.

(10) Patent No.: US 7,959,685 B2
(45) Date of Patent: Jun. 14, 2011

(54) DETERGENT COMPOSITIONS COMPRISING A POLYASPARTATE DERIVATIVE

(75) Inventors: Anthony McKee, Wirral (GB); Alyn James Parry, Wirral (GB); Susanne Henning Rogers, Wirral (GB); Albert van der Wal, Vaardingen (NL)

(73) Assignee: The Sun Products Corporation, Wilton, CT (US)

( * ) Notice: Subject to any disclaimer, the term of this patent is extended or adjusted under 35 U.S.C. 154(b) by 253 days.

(21) Appl. No.: 12/227,960

(22) PCT Filed: May 24, 2007

(86) PCT No.: PCT/EP2007/055066
§ 371 (c)(1),
(2), (4) Date: Dec. 3, 2008

(87) PCT Pub. No.: WO2007/141145
PCT Pub. Date: Dec. 13, 2007

(65) Prior Publication Data
US 2009/0176679 A1    Jul. 9, 2009

(30) Foreign Application Priority Data
Jun. 8, 2006   (GB) .................................. 0611218.9

(51) Int. Cl.
*B08B 3/04*    (2006.01)
*C11D 1/00*    (2006.01)
*C11D 3/26*    (2006.01)
*C11D 3/37*    (2006.01)
*C11D 9/30*    (2006.01)

(52) U.S. Cl. ............ 8/137; 510/276; 510/360; 510/475; 510/490; 510/499; 510/503; 510/535

(58) Field of Classification Search .................. 510/276, 510/360, 475, 490, 499, 503, 535; 8/137
See application file for complete search history.

(56) References Cited

U.S. PATENT DOCUMENTS

2003/0069153 A1*   4/2003   Jordan et al. .................. 510/276

\* cited by examiner

*Primary Examiner* — Brian P Mruk
(74) *Attorney, Agent, or Firm* — Sterne, Kessler, Goldstein & Fox P.L.L.C.

(57) ABSTRACT

The present invention provides a laundry detergent composition, a process for making said composition, the use of the composition in a laundry detergent and a method for treating fabric with the composition. Said laundry detergent compositions comprise a polyaspartate derivative modified with at least two hydrophilic groups, one of which is a charged hydrophilic group, surfactant and optionally other ingredients.

20 Claims, No Drawings

DETERGENT COMPOSITIONS COMPRISING A POLYASPARTATE DERIVATIVE

FIELD OF THE INVENTION

The invention relates to laundry detergent compositions comprising hydrophilically modified polyaspartate derivatives, a process of their manufacture and to their use in detergent formulations.

BACKGROUND OF THE INVENTION

Polyaspartate is a biopolymer synthesised from L-aspartic acid, a natural amino acid. Typically aspartic acid is heated to produce a polysuccinimide. The polysuccinimide is subsequently ring opened to form the polyaspartate material. Polyaspartate materials have been used in many different areas. An overview of the various uses is stated in U.S. Pat. No. 6,495,658. These range from biological coatings and antiscalants to dispersants in detergents. One attraction of such biopolymers is that they are biodegradable, which is becoming an increasingly important issue in relation to the environment.

U.S. Pat. No. 6,495,658 B2 discloses the thermal polymerisation of monomers of aspartic acid with a comonomer, such as monosodium aspartate to produce copolymers which comprise aspartate units and succinimide units.

U.S. Pat. No. 6,903,181 B2 discloses methods of synthesis of polysuccinimide. Also disclosed are methods of forming derivatives by a ring-opening reaction.

WO 03/014193 A1 discloses polyaspartate derivatives for use in detergent compositions. It is alleged therein that the disclosed polyaspartate derivatives provide improved fabric whiteness appearance and/or improved soil-release of stains from fabric and/or better dispersancy of particulate soils. Exemplified therein are polyaspartate derivatives that are derivatised with both hydrophilic and hydrophobic groups, some of which contain residual polysuccinimide groups.

There still remains a need for laundry compositions comprising one or more components with good biodegradability and which still provide good performance towards removal of particulate soils and oily stains.

Accordingly it is an object of the invention to provide a laundry composition that fulfils one or more of the aforementioned needs.

DEFINITION OF THE INVENTION

We have now found that laundry detergent compositions comprising polyaspartate derivatives with at least two different hydrophilic substituents provide laundry cleaning benefits and good biodegradability.

A first aspect of the invention provides a laundry detergent composition comprising:
a) a polyaspartate derivative, comprising at least one aspartate moiety derivatised with a hydrophilic group and at least one other aspartate moiety derivatised with a different hydrophilic group and optionally one or more aspartate and/or succinimide groups;
b) surfactant; and,
c) optionally other ingredients,
wherein at least one of the hydrophilic groups is a charged hydrophilic group.

The laundry detergent composition embodiment has the dual hydrophilic polyaspartate derivative derivatised with at least one charged hydrophilic group (i.e. a hydrophilic group that carries a charge).

A preferred embodiment has the dual hydrophilic polyaspartate derivative derivatised with at least one hydrophilic zwitterionic group. Optionally the polyaspartate derivative may have all of its hydrophilic derivatives being charged hydrophilic groups or hydrophilic zwitterionic groups.

A second aspect of the present invention provides a process for making the laundry detergent composition comprising the steps of:—
a) provision of a surfactant base;
b) admixture of a polyaspartate derivative to the surfactant base, said polyaspartate derivative comprising at least one aspartate moiety derivatised with a hydrophilic group and at least a second aspartate moiety derivatised with a different hydrophilic group and optionally one or more aspartate and/or succinimide groups, wherein at least one of the hydrophilic groups is a charged hydrophilic group; and,
c) optionally addition of other ingredients.

In a third aspect of the invention, the use of a polyaspartate derivative as herein defined in a laundry detergent is provided; especially the use for removal of oily soil, and the use for removal of particulate soil.

A fourth aspect of the invention is a method for treating a fabric article comprising the steps of:
a) providing a solution or dispersion of a polyaspartate derivative in a laundry detergent composition, said polyaspartate derivative comprising at least one aspartate moiety derivatised with a hydrophilic group and at least a second aspartate moiety derivatised with a different hydrophilic group and optionally one or more aspartate and/or succinimide groups, wherein at least one of the hydrophilic groups is a charged hydrophilic in a laundry detergent composition, and;
b) contacting a fabric article with said solution or dispersion, wherein the treatment occurs during a laundry cleaning process, preferably the main wash of the laundry process.

DETAILED DESCRIPTION OF THE INVENTION

In accordance with the present invention, the laundry detergent composition comprises:
a) a polyaspartate derivative, comprising at least one aspartate moiety derivatised with a hydrophilic group and at least one other aspartate moiety derivatised with a different hydrophilic group and optionally one or more aspartate and/or succinimide groups;
b) surfactant; and
c) optionally other ingredients,
wherein at least one of the hydrophilic groups is a charged hydrophilic group.

By polyaspartate, we mean the biopolymer synthesised from aspartic acid. This is usually made by heating the aspartic acid to form a polysuccinimide, which can be ring opened by a suitable nucleophile to form the polyaspartate species. The derivatised aspartate moiety in the present context is understood to mean that an aspartate unit linked via an amide linkage to other units in the polymer has a hydrophilic substituent attached to it. The derivatisation step occurs during the ring opening reaction of the polysuccinimide species.

Hydrophilic groups are ones that have an affinity for water. In the context of the present invention, preferred hydrophilic groups are those that are themselves considered biodegradable or those that will not have a large adverse effect on the biodegradability of the end polymer. The side hydrophilic groups are chosen so that upon incorporation into the polyaspartate derivative, the resulting derivatised polyaspartate species can still be considered biodegradable.

The hydrophilic groups used for derivatising the polyaspartate (by way of reacting with the polysuccinimide) each have a species capable of acting as a nucleophile. Such nucleophilic species can be heteroatoms, for example —SH, —OH, —$NH_2$ and —NHR. Preferred nucleophilic species are primary (—$NH_2$) and secondary amines (—NHR), even more preferred are primary amines.

The polyaspartate incorporated in the laundry composition of the present invention is derivatised with at least two different hydrophilic groups, one of which is a charged hydrophilic group, preferably a hydrophilic zwitterionic group. To remove uncertainty, both hydrophilic groups can be charged hydrophilic groups, or hydrophilic zwitterionic groups, as long as they are different. Preferred polyaspartate derivatives are those that are derivatised with at least one zwitterionic hydrophilic group and at least one non-zwitterionic hydrophilic group.

Preferred non-zwitterionic hydrophilic groups are those based on alkylene glycols and polymers made up from monomers that have at least one hydroxy group per monomer unit. A copolymer comprising two or more monomer units, at least one of which has hydroxy groups is also possible.

More preferred non-zwitterionic hydrophilic groups are those which are based on alkylene glycols, for example ethylene glycol and propylene glycol either alone or in combination as a mixture in the same alkylene glycol chain. Such alkylene glycols have the added advantage that they are considered biodegradable and add to the more environmentally acceptable of the laundry detergent component.

Hydrophilic zwitterionic groups are those which can be thought of to comprise a positively charged group and a negatively charged group. Examples of such zwitterionic groups are amine oxides, carbobetaines and sulfobetaines. The positive and negative charges may be on adjacent atoms (for example an amine oxide), or they can be on non-adjacent atoms, but which are in close proximity (such as carbobetaines). Preferably the positive and negative charges are not more than eight carbon atoms, more preferably six carbon atoms apart.

Zwitterionic groups may also have a permanent dipole. Amine oxides are examples of such groups with a permanent dipole. Preferably the hydrophilic zwitterionic group has a permanent dipole.

The polyaspartate derivative may also include at least one aspartate and/or succinimide group. The term aspartate group is taken to refer to a ring opened succinimide moiety that has not been derivatised by a hydrophilic group as defined herein. This leads to the free acid aspartate, or preferably an alkali metal ion salt of the acid depending on the conditions used in the ring opening reaction. By succinimide, we mean one more unreacted succinimide moieties still present in the polyaspartate chain.

In one embodiment of the present invention, the polyaspartate derivative has the formula:

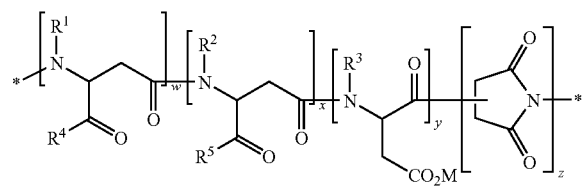

The positions of the w, x, y and z groups may be random along the chain. Alternatively they can be ordered, for instance as a block polymer. The above formula defines the different groups making up the polyaspartate derivative, and does not show any preference for the positioning of the groups along the polymeric chain.

The sum of w+x+y+z is from 2 to 200, preferably from 2 to 103, with w and x being at least 1 each. Preferably z=0. Y can also be equal to 0, wherein the polyaspartate derivative is 100% derivatised.

$R^1$, $R^2$ and $R^3$ are selected from hydrogen, or the same groups as defined for $R^4$ and $R^5$. Preferably $R^1$, $R^2$ and $R^3$ are hydrogen.

M is a monovalent cation, preferably a metal ion, more preferably an alkali metal ion, even more preferably a sodium ion.

$R^4$ is a zwitterionic hydrophilic group or a non-zwitterionic hydrophilic group linked to the polyaspartate chain by a heteroatom and $R^5$ is a zwitterionic group linked to the polyaspartate chain by a heteroatom, with the proviso that if both $R^4$ and $R^5$ are zwitterionic groups, then they are different. The linking heteroatom groups can be for example —S, —O, —NH and —NR. Preferred linking groups are those derived from primary (—$NH_2$) and secondary amines (—NHR), more preferred are primary amines.

When the group linking the hydrophilic and hydrophilic zwitterionic groups to the polyaspartate backbone is derived from an amine, then the polyaspartate derivative has the structure below:

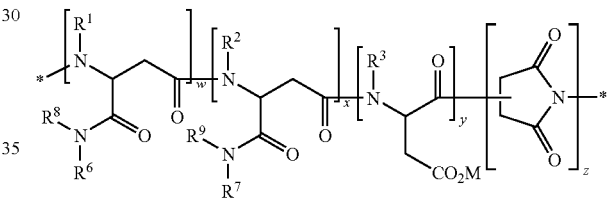

As for the more general earlier formula, the sum of w+x+y+z can be from 2 to 200, preferably from 2 to 103, with w and x being at least 1 each. Preferably z=0. Y can also be equal to 0, wherein the polyaspartate derivative is 100% derivatised. The positions of the w, x, y and z groups may be random along the chain. Alternatively they can be ordered, for instance as a block polymer. The above formula defines the different groups making up the polyaspartate derivative, and does not show any preference for the positioning of the groups along the polymeric chain.

In this preferred embodiment, $R^1$, $R^2$ and $R^3$ are as described above and are preferably hydrogen.

$R^6$ and $R^7$ represent the hydrophilic and hydrophilic zwitterionic groups attached to the polyaspartate chain. At least one of $R^6$ and $R^7$ must be a hydrophilic zwitterionic group as defined herein.

$R^8$ and $R^9$ may also be hydrophilic groups as defined for $R^6$ and $R^7$, or alternative substituents such as H, $C_1$-$C_{22}$ linear or branched alkyl, $C_2$-$C_{22}$ unsaturated alkyl, $C_6$-$C_{12}$ aryl, $C_7$-$C_{24}$ aralkyl or alkaryl. $R^8$ and $R^9$ are preferably both hydrogen.

The hydrophilic groups comprise alkylene glycols and polymers made up from monomers that have at least one hydroxy group per monomer unit. Such hydrophilic groups are selected from the group consisting of: —$(CH_2)_{1-20}$—$(OC_2$-$C_4)_{1-50}OR^{10}$, wherein the $C_2$-$C_4$ group can be linear or branched and is preferentially —$(CH_2)_{1-20}$—$(OCH_2CH_2)_{1-50}OR^{10}$, —$(CH_2)_{1-20}$—$(OCH_2C(CH_3)H)^{1-50}OR^{10}$, more preferably —$(CH_2)_{1-20}$—$(OCH_2CH_2)_x(OCH_2C(CH_3)H)_yOR^{10}$, where x+y is from 1 to 50; $(CH_2)_{1-20}$—$(CH_2CH(OH))_{1-50}$ $OR^{10}$; —$(CH_2)_{1-20}$—$(CH(OH)CH(OH))_{1-50}OR^{10}$; —$(CH_2)_{1-20}$—$(CH(OH)CH_2)_{1-50}OR^{10}$; and —$(CHR^{11})_{x'}$ $(CHR^{12})_{y'}R^{13}$, where x'+y' is from 1 to 20, wherein $R^{11}$, $R^{12}$ and $R^{13}$ can be the same or different and are independently selected from the group consisting of: H, OH, $OC_1$-$C_4$, $CO_2R^{14}$, $SO_2R^{14}$ and $SO_3R^4$, wherein $R^{14}$ is H, or a monovalent cation, preferably an alkali metal ion, more preferably sodium, with the proviso that at least one of $R^{11}$, $R^{12}$ and $R^{13}$ is a non-hydrogen and/or non hydrocarbon substituent. Some of the aforementioned hydrophilic groups are charged and can be used in accordance with the preferred polyaspartate embodiment which incorporates at least two hydrophilic polyaspartate derivatives, at least one of which incorporates a charged hydrophilic substituent.

$R^{10}$ is selected from H, $C_1$-$C_{22}$ linear or branched alkyl, $C_2$-$C_{22}$ unsaturated alkyl, $C_6$-$C_{12}$ aryl, $C_7$-$C_{24}$ aralkyl or alkaryl. Preferably $R^{10}$ is $C_1$-$C_4$ alkyl, more preferably it is a methyl group.

Preferred hydrophilic groups are those which comprise repeat ethylene glycol units and/or propylene glycol units. Especially preferred are those that comprise a mixture of ethylene glycol and propylene glycol units in the same hydrophilic chain. Commercial examples of such hydrophilic groups are supplied by Huntsman under the trade name Jeffamine (Trade Mark).

The poly(alkylene glycol) block may be obtainable from a single alkylene glycol, alkylene oxide or cyclic ether or a mixture of two or more different alkylene glycols, alkylene oxides or cyclic ethers. Although the poly(alkylene glycol) block may contain other than alkyleneoxy groups, it preferably comprises at least 75%, more preferably at least 85% by weight of alkyleneoxy groups. The poly(alkylene glycol) may be derived from a single monomer or may comprise residues derived from two or more different monomers. When the poly(alkylene glycol) is derived from two or more monomers, it may be a block copolymer or a random copolymer. For example, its composition may be a poly(ethylene glycol)-poly(propylene glycol)-poly(ethylene glycol) block copolymer.

Preferably the hydrophilic group comprises poly(ethylene) glycol and/or poly(propylene) glycol units or preferably a mixture thereof. Preferably the hydrophilic group is an amine functionalised poly(ethylene) glycol/poly(propylene) glycol chain, more preferably a primary amine. The hydrophilic group can contain numerous monomer repeat units, from 1 to 135. This figure reflects the total number of repeat units, whether they are of the same monomer, or of different monomers. The number of repeat units can be chosen by one skilled in the art to maximise the hydrophilicity of the group, whilst maintaining biodegradability. Preferably the number of repeat units is from 2 to 30, more preferably the number of repeat units is from 3 to 20, most preferably from 4 to 16. Preferably the molecular weight of the non-zwitterionic hydrophilic side chains is from 1000 to 6000.

The hydrophilic groups may carry a charge (though at least one hydrophilic group of the derivatised polyaspartate is charged); preferred dual hydrophilically derivatised polyaspartate derivatives comprise a hydrophilic group as described earlier as well as a hydrophilic group which is charged. Preferably the charged hydrophilic groups are derivatised with a hydrophilic zwitterionic group.

The zwitterionic group preferably comprises a positively charged quaternary amine.

The hydrophilic zwitterionic groups are preferably selected from the group of formula:

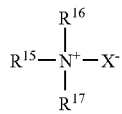

$R^{15}$ is defined as the group linking the zwitterionic group to the heteroatom attached to the polyaspartate chain. $R^{15}$, $R^{16}$ and $R^{17}$ can be $C_1$-$C_{22}$ linear or branched alkyl, $C_2$-$C_{22}$ unsaturated alkyl, $C_6$-$C_{12}$ aryl, $C_7$-$C_{24}$ aralkyl or alkaryl. The nitrogen atom can also be part of a ring, for example a $C_5$ or $C_6$ ring, which can also be aromatic or aliphatic; X is defined as a negatively charged side chain group.

X is a group which can be thought of to be negatively charged, or one which can formally be a zwitterion when combined with the positively charged nitrogen group. X can be oxygen, in which case the hydrophilic zwitterion is an amine oxide, in the alternative X can be a carbobetaine group of formula $(CH_2)_aCOO^-$, wherein a is from 1 to 18, preferably from 1 to 8, more preferably 1 to 4, even more preferably a is 1. Another zwitterionic class of the above formula are the sulfobetaines. For these compounds, X is represented by the formula $(CH_2)_bSO_3^-$, wherein b is from 1 to 18, preferably from 1 to 8, more preferably 2 to 4, even more preferably b is 2 to 3.

Preferably the zwitterionic groups are amine oxides, carbobetaines and sulfobetaines, more preferably they are amine oxides and carbobetaines.

In a preferred embodiment, $R^{15}$, $R^{16}$ and $R^{17}$ define an aryl ring containing nitrogen linked to the polyaspartate chain by a primary amine and hydrocarbon chain wherein the amine oxide is made from pyridine.

The laundry detergent composition of the present invention can take many forms, and relates to a composition used in the main wash cycle of an automatic or semi-automatic machine, or to a composition used in hand-wash.

The skilled person will understand that by varying the conditions and stoichiometry of the ring opening derivatisation reaction a polyaspartate derivative having varying amounts of non-derivatised aspartate and/or succinimide groups can be provided. Preferably the polyaspartate derivative contains no remaining succinimide groups. This means that preferably all of the succinimide groups have been ring opened.

The polyaspartate derivatives of the present invention may have any molecular weight, though preferably the molecular weight is 50,000 or lower, more preferably the molecular weight is 20,000 or lower, even more preferably from 1,000 to 20,000.

The laundry detergent composition of the invention incorporates the polyaspartate derivative at a level of from 0.001 to 20%, preferably 0.002 to 10%, more preferably 0.003 to 8% by weight of the total formulation.

The polyaspartate derivative will generally have end groups that are either normal polyaspartate end groups, i.e. amino, and carboxylate or dicarboxylate (or alkali metal salts of these), or end groups formally resulting from reaction of the normal end groups with capping monomers. This includes amides formed from an amino end group reacting with a monocarboxylate, including, but not limited to oleic acid, benzoic acid, 2-ethylhexanoic acid, and ethoxylated monocarboxylates. It also includes amides or imides formed from the normal carboxylate or dicarboxylate ends reacting with primary or secondary monoamines including, but not limited to oleylamine, dodecylamine, benzylamine, and ethoxylated primary or secondary amines.

The polyaspartate derivative is preferably endcapped with amine groups and/or carboxylate groups or alkali metal salts thereof.

Surfactant

The surfactant, or detergent-active compound present in the surfactant base may be present as a single surfactant, or as two or more surfactants. The term surfactant should be construed herein as encompassing a single surfactant or a mixture of two or more surfactants.

Detergent-active compounds (surfactants) may be chosen from soap and non-soap anionic, cationic, non-ionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch. The preferred detergent-active compounds that can be used are soaps and synthetic non-soap anionic and non-ionic compounds. The total amount of surfactant present is suitably within the range of from 5 to 60 wt. %, preferably from 5 to 40 wt. %.

Anionic surfactants are well-known to those skilled in the art. Examples include alkylbenzene sulphonates, particularly linear alkylbenzene sulphonates having an alkyl chain length of $C_8$-$C_{15}$; primary and secondary alkylsulphates, particularly $C_8$-$C_{20}$ primary alkyl sulphates; alkyl ether sulphates; olefin sulphonates; alkyl xylene sulphonates; dialkyl sulphosuccinates; and fatty acid ester sulphonates. Sodium salts are generally preferred.

Non-ionic surfactants that may be used include the primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated non-ionic surfactants include alkylpolyglycosides, glycerol monoethers, and polyhydroxyamides (glucamide).

Cationic surfactants that may be used include quaternary ammonium salts of the general formula $R_1R_2R_3R_4N^+ X^-$ wherein the R groups are long or short hydrocarbyl chains, typically alkyl, hydroxyalkyl or ethoxylated alkyl groups, and X is a solubilising anion (for example, compounds in which $R_1$ is a $C_8$-$C_{22}$ alkyl group, preferably a $C_8$-$C_{10}$ or $C_{12}$-$C_{14}$ alkyl group, $R_2$ is a methyl group, and $R_3$ and $R_4$, which may be the same or different, are methyl or hydroxyethyl groups); and cationic esters (for example, choline esters).

According to a preferred embodiment of the invention, the composition comprises a sulphonate anionic surfactant and/or a primary alcohol sulfate surfactant.

According to an especially preferred embodiment, the sulphonate anionic surfactant comprises linear alkylbenzene sulphonate (LAS) and/or primary alcohol sulfate (PAS).

In a preferred embodiment, the surfactant base comprises at least an anionic surfactant and a non-ionic surfactant. Even more preferred is a surfactant base comprising an anionic, non-ionic and amphoteric or zwitterionic surfactant.

Preferred non-ionic surfactants are the primary and secondary alcohol ethoxylates.

Preferred amphoteric or zwitterionic surfactants are amine oxides and betaines, especially carbobetaines and sulfobetaines. An example of one such surfactant is lauryl betaine.

The surfactants are generally present in the final formulations at a level of from 1 to 80% by weight of the total formulation, preferably from 2 to 60%, more preferably from 5 to 60% and most preferably from 5 to 40% by weight of total formulation.

The laundry detergent composition of the present invention utilises the polyaspartate derivative defined herein for laundry cleaning purposes. The laundry detergent composition comprising the polyaspartate derivative has been found to be active for oily soil removal and particulate soil removal. Accordingly the invention also relates to the use of the polyaspartate derivative in a laundry detergent composition, the use of the polyaspartate derivative in a laundry composition for the removal of particulate soil, and the use of the polyaspartate derivative in a laundry composition for the removal of oily soil.

The invention further relates to a method for treating a fabric article comprising the steps of:

a) providing a solution or dispersion of a polyaspartate derivative in a laundry detergent composition, said polyaspartate derivative comprising at least one aspartate moiety derivatised with a hydrophilic group and at least a second aspartate moiety derivatised with a different hydrophilic group and optionally one or more aspartate and/or succinimide groups, wherein at least one of the hydrophilic groups is a charged hydrophilic, and;

b) contacting a fabric article with said solution or dispersion, wherein the treatment occurs during a laundry cleaning process, preferably the main wash of the laundry process.

If the laundry process is carried out as a hand wash process then the treatment will occur during the hand wash stage of the laundry process.

The method of the invention further relates to the removal of oily soil and/or particulate soil from a fabric article.

The fabric article can be any fabric textile article, preferably it is a non-keratinaceous textile such as cotton or polyester. The laundry detergent composition of the invention is preferably a main wash detergent for use in the main wash cycle of machines or in the hand-wash, and so preferably the contacting of the fabric article occurs during the main wash or hand wash Other Detergent Ingredients The laundry detergent composition will generally comprise other detergent ingredients well known in the art. These may suitably be selected from bleach ingredients, enzymes (proteases, lipases, amylases and cellulases); inorganic salts such as sodium carbonate, sodium silicate and sodium sulphate, antiredeposition agents such as cellulosic polymers; foam controllers, foam boosters, perfumes, fabric conditioners, soil release polymers, dye transfer inhibitors, photobleaches, fluorescers and coloured speckles. This list is not intended to be exhaustive. Detergent compositions according to the invention may also suitably contain a bleach system. Preferably this will include a peroxy bleach compound, for example, an inorganic persalt or an organic peroxyacid, capable of yielding hydrogen peroxide in aqueous solution. Preferred inorganic persalts are sodium perborate monohydrate and tetrahydrate, and sodium percarbonate, the latter being especially preferred. The sodium percarbonate may have a protective coating against destabilisation by moisture. The peroxy bleach compound is suitably present in an amount of from 5 to 35 wt. %, preferably from 10 to 25 wt. %.

The peroxy bleach compound may be used in conjunction with a bleach activator (bleach precursor) to improve bleaching action at low wash temperatures. The bleach precursor is suitably present in an amount of from 1 to 8 wt. %, preferably from 2 to 5 wt. %. Preferred bleach precursors are peroxycarboxylic acid precursors, more especially peracetic acid precursors and peroxybenzoic acid precursors; and peroxycarbonic acid precursors. An especially preferred bleach precursor suitable for use in the present invention is N,N,N',N'-tetracetyl ethylenediamine (TAED).

A bleach stabiliser (heavy metal sequestrant) may also be present. Suitable bleach stabilisers include ethylenediamine tetraacetate (EDTA), diethylenetriamine pentaacetate (DTPA), ethylenediamine disuccinate (EDDS), and the polyphosphonates such as the Dequests (Trade Mark), ethylenediamine tetramethylene phosphonate (EDTMP) and diethylenetriamine pentamethylene phosphate (DETPMP).

The compositions of the invention may contain alkali metal, preferably sodium, carbonate, in order to increase detergency and ease processing. Sodium carbonate may suitably be present in amounts ranging from 1 to 60 wt. %, preferably from 2 to 40 wt. %.

As previously indicated, sodium silicate may also be present. The amount of sodium silicate may suitably range from 0.1 to 5 wt. %. Sodium silicate, as previously indicated, is preferably introduced via the second base granule.

Powder flow may be improved by the incorporation of a small amount of a powder structurant. Examples of powder structurants, some of which may play other roles in the formulation as previously indicated, include, for example, fatty acids (or fatty acid soaps), sugars, acrylate or acrylate/maleate polymers, sodium silicate, and dicarboxylic acids (for example, Sokalan (Trade Mark) DCS ex BASF). One preferred powder structurant is fatty acid soap, suitably present in an amount of from 1 to 5 wt. %.

The compositions of the invention may be in any physical form e.g. a solid such as a powder or granules, a tablet, a solid bar, a paste, gel or liquid, especially, an aqueous based liquid. In many of these compositions, particularly non-liquid formulations, detergent builder may be required as a necessary component of the composition. Where such a requirement exists the builder is preferably incorporated at a level of from 0 to 30% by weight of total formulation.

In addition to the aforementioned surfactants, the laundry detergent compositions of the invention may contain additional surface-active compound (surfactant) which may be chosen from soap and non-soap anionic, cationic, non-ionic, amphoteric and zwitterionic surface-active compounds and mixtures thereof. Many suitable surface-active compounds are available and are fully described in the literature, for example, in "Surface-Active Agents and Detergents", Volumes I and II, by Schwartz, Perry and Berch.

The invention will now be illustrated by the following non-limiting examples.

EXAMPLES

Example 1

Preparation of a Polyaspartate Derivative with Two Hydrophilic Groups

Step A Preparation of 4-(aminomethyl)pyridine and O-(2-aminoethyl)-O'-methyl-poly(ethylene glycol) 750 Modified poly(succinimide)

Experimental 0.5 g (5.15 mmol) of poly(succinimide) was dissolved in 20 cm$^3$ of anhydrous N,N-dimethylsulfoxide. O-(2-Aminoethyl)-O'-methyl-poly(ethylene glycol) 750 (1 eq.) is then added along with 4-(aminomethyl)pyridine (0.5 eq.) and the mixture is stirred as the temperature is raised to 75° C. and held there for about 16 hours. The DMSO solvent is removed under reduced pressure at 80° C. using a rotary evaporator, the residue taken up in demineralised water and the pH adjusted to pH 9 using NaOH solution. This solution is then dialysed against demineralised water using 1K cut-off dialysis tubing for 72 hours, changing the water daily. The water is removed using a rotary evaporator, followed by further evaporation under reduced pressure to constant weight, resulting in a yellow-coloured, waxy product.

IR Analysis:
  absence of succinimide functionality
  $^1$H-NMR analysis (D$_2$O):

| | | |
|---|---|---|
| 2.4-3 ppm | (broad multiplet signals due to poly(aspartate) backbone CH$_2$ and to amino PEG-NH—CH$_2$ protons); |
| 3.2 ppm | (t, amino PEG-NHCH$_2$CH$_2$O—); |
| 3.4 ppm | (s, amino PEG-OCH$_3$); |
| 3.5-3.9 ppm | (broad multiplet, amino PEG-OCH$_2$CH$_2$O—); |
| 4.4-4.6 ppm | (broad peak, signals due to poly(aspartate) backbone CH and to 4-(aminomethyl)pyridine CH$_2$ protons); |
| 7.2-7.4 ppm | (broad peak, 4-(aminomethyl)pyridine o-aromatic protons); |
| 8.3-8.5 ppm | (broad peak, 4-(aminomethyl)pyridine m-aromatic protons). |

Step B Oxidation of 4-(aminomethyl)pyridine and O-(2-aminoethyl)-O'-methyl-poly(ethylene glycol) 750 Modified poly(succinimide)

Experimental 2 g of 4-(aminomethyl)pyridine and O-(2-aminoethyl)-O'-methyl-poly(ethylene glycol) 750 modified poly(succinimide) was dissolved in 10 cm$^3$ of demineralised water, to which was then added 1.5 g sodium tungstate followed by 3 cm$^3$ of hydrogen peroxide solution (30%). The reaction mixture was then heated to 75° C., which was maintained for 3 hours. After this time, the reaction mixture was cooled to ambient temperature and the product recovered after precipitation and filtration from 2-propanol. The product was re-dissolved into demineralised water and dialysed using 1K cut-off tubing for 48 hours. A white crystalline product was recovered after freeze-drying.

$^1$H-NMR analysis (D$_2$O):

| | |
|---|---|
| 2.4-3 ppm | broad multiplet signals due to poly(aspartate) backbone CH$_2$ and to amino PEG-NH—CH$_2$ protons); |
| 3.2-3.4 ppm | (multiplet, amino PEG-NHCH$_2$CH$_2$O—; amino PEG-OCH$_3$); |
| 3.5-4 ppm | (broad multiplet, amino PEG-OCH$_2$CH$_2$O—); |
| 4.3-4.5 ppm | (broad peak, signals due to poly(aspartate) backbone CH and to 4-(aminomethyl)pyridine CH$_2$ protons); |
| 7.4-7.6 ppm | (broad peak, 4-(aminomethyl)pyridine N-oxide o-aromatic protons); |
| 8.2-8.4 ppm | (broad peak, 4-(aminomethyl)pyridine N-oxide m-aromatic protons); |

Example 2

Detergency Experiment

The detergency experiment was carried out at 25° C. Wash liquor conditions were 5 mM NaCl, 6FH (2:1 Ca:Mg) and pH 7. In all cases total surfactant dose was kept at 1.3 g/L. Below in Tables 1 & 2 are shown the PAS/NI and PAS/NI/CB surfactant bases.

PAS refers to a primary alcohol sulfate, C12E7 refers to a non-ionic alcohol ethoxylate surfactant.

TABLE 1

PAS/NI surfactant base

| Ingredient | Amount (g/L) |
| --- | --- |
| Anionic Surfactant PAS (Primary Alcohol sulfate) Trade name EMAL PH10 | 0.87 |
| Non-ionic surfactant C12E7 (Alcohol ethoxylate) | 0.43 |

CB in table 2 refers to Lauryl Carbobetaine, an example of a zwitterionic surfactant.

TABLE 2

PAS/NI/CB surfactant base

| Ingredient | Amount (g/L) |
| --- | --- |
| PAS | 0.8 |
| C12E7 | 0.4 |
| CB (Lauryl Carbobetaine) | 0.1 |

To both bases was added a polyaspartate derivative, with the structure as shown in FIG. 2, and added at a level of 0.13 g/L

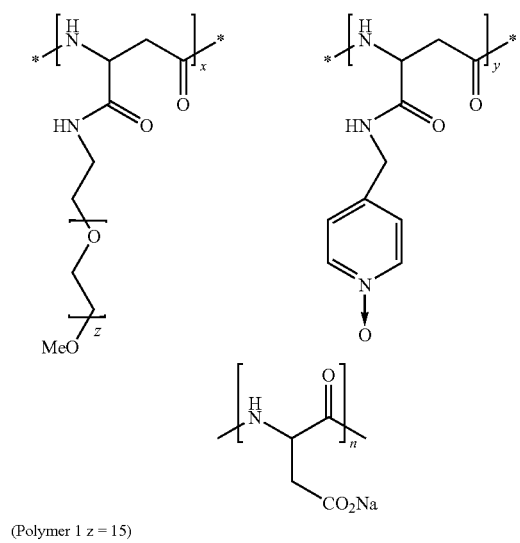

(Polymer 1 z = 15)

FIG. 2

Example 3

Action on Hamburger Grease

Table 3 summarises the results of a detergency experiment performed on a Hamburger Fat stained knitted polyester, the values correspond to stain removal, the higher the number, the better the formulation works at stain removal.

TABLE 3

Showing the stain removal benefit of the hydrophilically modified polyaspartate derivative

| Formulation | LSMEAN SRI |
| --- | --- |
| PAS/NI | 89.69 |
| PAS/NI/CB | 91.09 |
| PAS/NI/P1 | 91.08 |
| PAS/NI/CB/P1 | 93.4 |

Wash Protocol
1. Switch on the Linitest
2. Fill up the containers with required stock solution to make up the relevant washing liquor.
3. Load the stains swatches as well as ballast into the containers.
4. Put the lids on after 50 ball bearings are added and start the wash.
5. After the wash, get rid of the washing liquor and squeeze out the excess liquor.
6. Add 200 ml of 6° FH water into the containers and close the lids.
7. Clamp the containers onto the machine and start the machine for 3 mins.
8. Repeat the above steps 6-7.
9. Wring the cloths and transfer the stains swatch onto the drying rack.
10. Cloths will be drying overnight in the dark.

Example 4

Typical Product Formulations for a Powder and Liquid Product

| Powder Formulation | |
| --- | --- |
| Ingredient | Weight % in Final Product |
| Linear Alkyl benzene sulfonate | 10 |
| Alcohol Ethoxylate | 5 |
| Zwitterionic surfactant | 1 |
| Zeolite builder | 20 |
| Sodium carbonate | 20 |
| Enzymes | 1 |
| Whitening agent | 0.1 |
| Bleach | 15 |
| Bleach activator | 1 |
| Polyaspartate Polymer | 2 |
| Perfume, foam control & other minors | Balance |

| Liquid Detergent Formulation | |
| --- | --- |
| Ingredient | Weight % in Final Product |
| Linear Alkyl benzene sulfonate | 10 |
| Alcohol Ethoxylate | 5 |
| Zwitterionic | 1 |

-continued

| Liquid Detergent Formulation | |
|---|---|
| Ingredient | Weight % in Final Product |
| surfactant | |
| Sodium Citrate | 5 |
| Sodium chloride | 2 |
| Sodium Hydroxide | 1 |
| Dispersent | 1 |
| Enzymes | 1 |
| Whitening agent | 0.1 |
| Polyaspartate Polymer | 2 |
| Water, Perfume, foam control & other minors | Balance |

The invention claimed is:

1. A laundry detergent composition comprising:
a) a polyaspartate derivative, comprising at least one aspartate moiety derivatised with a hydrophilic group and at least one other aspartate moiety derivatised with a different hydrophilic group, and optionally one or more aspartate and/or succinimide groups;
b) one or more surfactants; and
c) optionally other ingredients,
wherein at least one of the two hydrophilic groups is a zwitterionic hydrophilic group, and the level of the polyaspartate derivative is from 0.001% to 20% by weight of the total composition.

2. The laundry detergent composition according to claim 1, wherein the zwitterionic group is selected from the group consisting of amine oxides, carbobetaines and sulfobetaines.

3. A laundry detergent composition comprising:
a) a polyaspartate derivative in an amount from 0.001% to 20% by weight of the total composition,
b) one or more surfactants, and
c) optionally other ingredients,
wherein the polyaspartate derivative has the formula:

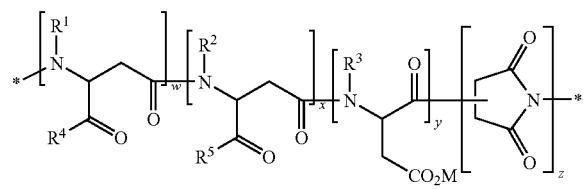

wherein:
the sum of w+x+y+z is from 2 to 200;
w and x are independently at least one;
$R^1$, $R^2$ and $R^3$ are selected from the same groups as defined for $R^4$ and $R^5$, or hydrogen;
M is an ammonium cation or an alkali metal ion;
$R^4$ is a zwitterionic hydrophilic group selected from the group consisting of amine oxides, carbobetaines and sulfobetaines, or a non-zwitterionic hydrophilic group linked to the polyaspartate chain by a heteroatom that is S, O or N;
$R^5$ is a zwitterionic hydrophilic group selected from the group consisting of amine oxides, carbobetaines and sulfobetaines, linked to the polyaspartate chain by a heteroatom that is S, O or N, with the proviso that if both $R^4$ and $R^5$ are zwitterionic groups, then they are different.

4. The laundry detergent composition according to claim 3, wherein the polyaspartate derivative has the formula:

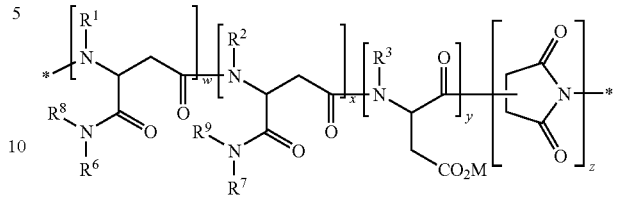

wherein:
$R^1$, $R^2$, $R^3$, $R^8$ and $R^9$ are hydrogen;
$R^6$ is a zwitterionic hydrophilic group selected from the group consisting of amine oxides, carbobetaines and sulfobetaines, or a non-zwitterionic hydrophilic group —$(CH_2)_{1-20}$—$(OC_2-C_4)_{1-50}OR^{10}$, wherein the $C_2$-$C_4$ group can be linear or branched;
$R^7$ is a zwitterionic hydrophilic group selected from the group consisting of amine oxides, carbobetaines and sulfobetaines, with the proviso that if both $R^6$ and $R^7$ are zwitterionic groups, then they are different; and,
$R^{10}$ is H, $C_1$-$C_{22}$ linear or branched alkyl, $C_2$-$C_{22}$ unsaturated alkyl, $C_6$-$C_{12}$ aryl, $C_7$-$C_{24}$ aralkyl or alkaryl.

5. The laundry detergent composition according to claim 4, wherein the zwitterionic hydrophilic group is selected from the group consisting of amine oxides and carbobetaines.

6. The laundry detergent composition according to claim 5, wherein the polyaspartate derivative comprises a non-zwitterionic hydrophilic group which is an alkylene oxide.

7. The laundry detergent composition according to claim 6, wherein the alkylene oxide comprises units of ethylene glycol, propylene glycol, or mixtures thereof.

8. The laundry detergent composition according to claim 7, wherein the polyaspartate derivative is endcapped with amine groups, carboxylate groups or alkali metal salts thereof.

9. The laundry detergent composition according to claim 8, wherein the surfactant comprises an anionic, non-ionic, zwitterionic or amphoteric surfactant.

10. The laundry detergent composition according to claim 9, wherein the surfactant is present at a level of from 1% to 80% by weight of the total composition.

11. A process for making a laundry detergent composition comprising:
a) providing a surfactant base;
b) mixing the polyaspartate derivative according to claim 1 with the surfactant base, and,
c) optionally adding other ingredients.

12. A method for treating a fabric article comprising:
a) providing a solution or dispersion of the polyaspartate derivative according to claim 1 in a laundry detergent composition, and,
b) contacting a fabric article with said solution or dispersion,
wherein the treatment occurs during a laundry cleaning process.

13. The method according to claim 12, comprising removing oily soil.

14. The method according to claim 12, comprising removing particulate soil.

15. The method according to claim 12, wherein the treatment occurs during the main wash of the laundry process.

16. The laundry detergent composition according to claim 3, wherein $R^1$, $R^2$ and $R^3$ are hydrogen; and M is sodium ion.

17. The laundry detergent composition according to claim 4, wherein:

$R^6$ is a non-zwitterionic hydrophilic group selected from the group consisting of $-(CH_2)_{1-20}-(OCH_2CH_2)_{1-50}OR^{10}$; $-(CH_2)_{1-20}-(OCH_2C(CH_3)H)_{1-50}OR^{10}$; $-(CH_2)_{1-20}-(OCH_2CH_2)_x(OCH_2C(CH_3)H)_yOR^{10}$, where x+y is from 1 to 50; $-(CH_2)_{1-20}-(OCH_2CH(OH))_{1-50}OR^{10}$; $-(CH_2)_{1-20}-)CH(OH)CH(OH))_{1-50}OR^{10}$; $-(CH_2)_{1-20}-(CH(OH)CH_2)_{1-50}OR^{10}$; and $-(CHR^{11})_x(CHR^{12})_yR^{13}$, where x'+y' is from 1 to 20, wherein $R^{11}$, $R^{12}$ and $R^{13}$ are the same or different and are independently selected from the group consisting of H, OH, $OC_1-C_4$, $CO_2R^{14}$, $SO_2R^{14}$ and $SO_3R^{14}$, wherein $R^{14}$ is H, or a monovalent cation, with the proviso that at least one of $R^{11}$, $R^{12}$ and $R^{13}$ is a non-hydrogen and/or non hydrocarbon substituent.

18. A process for making the laundry detergent composition of claim 3 comprising:
 a) providing a surfactant base;
 b) mixing the polyaspartate derivative with the surfactant base; and,
 c) optionally adding other ingredients.

19. A method for treating a fabric article comprising:
 a) providing the laundry detergent composition of claim 3; and
 b) contacting a fabric article with the laundry detergent, wherein the treatment occurs during a laundry cleaning process.

20. The method according to claim 19, wherein the treatment occurs during the main wash of the laundry process.

* * * * *